US010771521B2

(12) United States Patent
Persson

(10) Patent No.: US 10,771,521 B2
(45) Date of Patent: Sep. 8, 2020

(54) METHODS AND SYSTEMS FOR OVERLAYING AND PLAYBACK OF AUDIO DATA RECEIVED FROM DISTINCT SOURCES

(71) Applicant: Spotify AB, Stockholm (SE)

(72) Inventor: Pontus Persson, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 14/979,225

(22) Filed: Dec. 22, 2015

(65) Prior Publication Data

US 2017/0180438 A1    Jun. 22, 2017

(51) Int. Cl.
*H04L 29/06* (2006.01)
*H04W 4/80* (2018.01)
*H04N 21/439* (2011.01)
*H04N 21/8547* (2011.01)
*H04N 21/462* (2011.01)
*G11B 27/10* (2006.01)
*G10H 1/36* (2006.01)

(Continued)

(52) U.S. Cl.
CPC ......... *H04L 65/4084* (2013.01); *G10H 1/366* (2013.01); *G10L 21/013* (2013.01); *G10L 21/055* (2013.01); *G11B 27/10* (2013.01); *G11B 27/11* (2013.01); *H04N 21/439* (2013.01); *H04N 21/4622* (2013.01); *H04N 21/8113* (2013.01); *H04N 21/8547* (2013.01); *H04W 4/80* (2018.02); *G10H 2240/211* (2013.01)

(58) Field of Classification Search
USPC ....................................................... 700/94
See application file for complete search history.

(56) References Cited

U.S. PATENT DOCUMENTS 6,022,223 A * 2/2000 Taniguchi .............. G10H 1/365
                                              370/437
6,084,168 A * 7/2000 Sitrick .................. G09B 15/023
                                              84/477 R (Continued)

FOREIGN PATENT DOCUMENTS

EP       2808870 A1    12/2014
EP       2927826 A1    10/2015

OTHER PUBLICATIONS

Harry Newton, Newton's Telecom Dictionary, 2006, CMPBooks, 22ed, 533 (Year: 2006).*

(Continued)

*Primary Examiner* — Amal S Zenati
(74) *Attorney, Agent, or Firm* — Morgan, Lewis & Bockius LLP

(57) ABSTRACT

Methods, systems, and/or devices for overlaying and playing back audio data for user vocals and media content received from distinct devices and systems at a media presentation system are described herein. In one aspect, a media presentation system receives, from a remote server, a first data stream for a first media item, and plays the first media item. While playing the first media item, a second data stream for audio data that includes vocals is received from an application at a client device distinct from the remote server. The vocals are overlaid with the first media item to generate a composite data stream, which includes combining the first and second data streams, and the media presentation system plays the overlaid vocals.

16 Claims, 7 Drawing Sheets

(51) Int. Cl.
    *G11B 27/11*     (2006.01)
    *H04N 21/81*     (2011.01)
    *G10L 21/013*     (2013.01)
    *G10L 21/055*     (2013.01)

(56) References Cited

U.S. PATENT DOCUMENTS

| | | | |
|---|---|---|---|
| 9,412,390 B1* | 8/2016 | Chaudhary | G10L 21/00 |
| 2002/0193895 A1* | 12/2002 | Qian | G10L 21/06 |
| | | | 700/94 |
| 2008/0113325 A1* | 5/2008 | Mellqvist | G06Q 30/0601 |
| | | | 434/307 A |
| 2011/0144981 A1* | 6/2011 | Salazar | G06F 3/165 |
| | | | 704/207 |
| 2011/0252322 A1 | 10/2011 | Roberts | |
| 2013/0290842 A1* | 10/2013 | Rose | G06F 17/30867 |
| | | | 715/273 |
| 2013/0290843 A1 | 10/2013 | Lehtiniemi et al. | |
| 2014/0108929 A1 | 4/2014 | Garmark et al. | |

OTHER PUBLICATIONS

Spotify AB, International Search Report and Written Opinion, PCT/IB2016/001896, dated May 18, 2017, 10 pgs.
Spotify AB, Communication Pursuant to Article 94(3), EP16840316.0, dated Jan. 30, 2019, 5 pgs.

\* cited by examiner

METHODS AND SYSTEMS FOR OVERLAYING AND PLAYBACK OF AUDIO DATA RECEIVED FROM DISTINCT SOURCES

TECHNICAL FIELD

The disclosed implementations relate generally to media playback, and, in particular, to overlaying and playing back audio data and media content received from distinct devices and systems.

BACKGROUND

In addition to playing back requested media content, users sometimes desire to sing along with the media being played. Users may, for example, wish to overlay a music track with their own vocals by singing into a microphone as the music plays. A system that provides this functionality typically consists of a wired microphone physically plugged into a device that only plays locally stored content. Consequently, typical systems substantially encumber the ability of users to select and control media content for playback, and to easily provide their vocals for overlaying with media content.

SUMMARY

Accordingly, there is a need for devices, systems, and methods for overlaying audio data for user vocals and media content received from distinct devices and systems. User vocals captured using a microphone of a client device may be transmitted to a media presentation system, while corresponding media content, such as a music track, is transmitted to the media presentation system from a remote server distinct from the client device. As the media presentation system plays the media content, the received user vocals are overlaid with the media content for playback as a composite data stream. Users are therefore able to more efficiently, effectively, and securely overlay and play back audio data.

In accordance with some implementations, a method is performed at a media presentation system (e.g., a home stereo or theater system) having one or more processors and memory storing instructions for execution by the one or more processors. The method includes receiving, from a remote server, a first data stream for a first media item, and playing the first media item. While playing the first media item, a second data stream for audio data that includes vocals is received from an application at a client device distinct from the remote server. The vocals are overlaid with the first media item to generate a composite data stream, which includes combining the first and second data streams, and the media presentation system plays the overlaid vocals.

In accordance with some implementations, a media presentation system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the media presentation system, cause the media presentation system to perform the operations of the method described above.

Thus, devices are provided with efficient, user-friendly methods for overlaying and playing back audio data.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first data stream could be termed a second data stream, and, similarly, a second data stream could be termed a first data stream, without departing from the scope of the various described implementations. The first data stream and the second data stream are both data streams, but they are not the same data stream.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
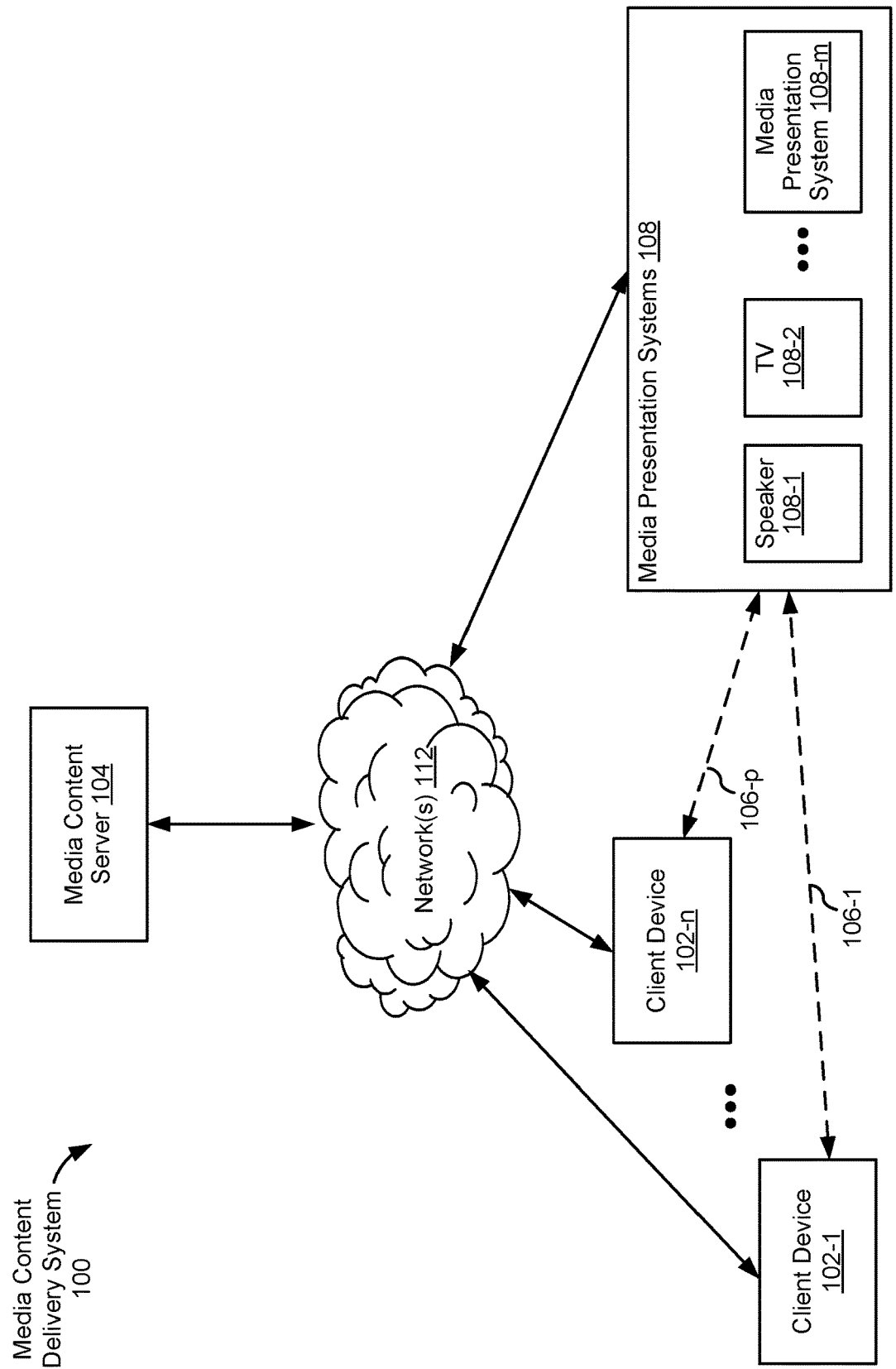
FIG. 1 is a block diagram illustrating an exemplary media content delivery system in accordance with some implementations.

FIG. 1 is a block diagram illustrating an exemplary media content delivery system 100 in accordance with some implementations. The media content delivery system 100 includes one or more client devices 102-1 . . . 102-n (where n is an integer greater than or equal to one), one or more media content servers 104, and one or more media presentation systems 108, including speaker 108-1, television (TV) 108-2, and/or other media presentation system 108-m (where m is an integer greater than two). One or more networks 112 communicably connect each component of the media content delivery system 100 with other components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

A client device 102 (e.g. client device 102-1, . . . client device 102-n) is associated with one or more users. In some implementations, a client device is a personal computer, a mobile electronic device, a wearable computing device, a laptop, a tablet computer, a mobile phone, a feature phone, a smart phone, a digital media player, or any other electronic device capable of executing and/or transmitting commands for playing media content (e.g., transmitting media control requests to a media content server 104, which, in response, sends audio data to a media presentation system 108 for playing a requested media item). In some implementations, client devices 102 include input devices for receiving user inputs (e.g., microphones for recording vocal input from a user singing or speaking, which the client devices may store and/or transmit to other components of the media content delivery system 100, such as the media content server 104, media presentation system 108, other client devices 102, etc.). In some implementations, client devices 102 are the same type of device (e.g., mobile devices). Alternatively, client devices 102 include different types of devices.

Media presentation systems 108 (e.g., speaker 108-1, TV 108-2, . . . media presentation system 108-m) are capable of receiving media content (e.g., a data stream for a requested media item from the media content server 104) and presenting the received media content. For example, in some implementations, speaker 108-1 is a component of a network-connected audio/video system (e.g., a home entertainment system, a radio/alarm clock with a digital display, or an infotainment system of a vehicle). In some implementations, the media content server 104 and/or client devices 102 can send media content to media presentation systems 108. For example, media presentation systems include computers, dedicated media players, network-connected stereo and/or speaker systems, network-connected vehicle media systems, network-connected televisions, network-connected DVD players, and universal serial bus (USB) devices with network connectivity that provide playback, and the like. In some implementations, media presentation systems 108 are also client devices 102 (e.g., a mobile phone that plays music, where playback is controlled by a different client device 102).

The media content server 104 stores media content and provides the media content (e.g., media content requested by the media application 222, FIG. 2, of client device 102-1 and/or 102-2), via the network(s) 112, to the media presentation systems 108 (and the media presentation systems 108 receive media content from the media content server 104 via the network(s) 112). Content stored and served by the media content server 104, in some implementations, includes audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). The description of the media content server 104 as a "server" is intended as a functional description of the devices, systems, processor cores, and/or other components that provide the functionality attributed to the media content server 104. It will be understood that the media content server 104 may be a single server computer or multiple server computers. The media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

In some implementations, media presentation systems 108 are used to play media items (e.g., data stream of music received from media content server 104) and overlay the media items with audio data received from one or more client devices 102 (e.g., a data stream of user vocals) as the media items are played. Client devices 102 may be used to browse and control playback of media items on the media presentation systems 108 (e.g., via media application 222, FIG. 2), and to store and/or transmit audio data (e.g., user vocals) to be overlaid with the media items. In some implementations, a client session for playing media items is initiated at a media presentation system 108 (e.g., television 108-2). Client devices 102 (e.g., smartphones) then may connect with the media presentation system 108 to remotely control the client session and/or to act as microphones for the client session.

Client devices 102, the media content server 104, and media presentation systems 108 may be communicably coupled in a variety of ways. In some implementations, a client device 102-1 sends a media control request (e.g., request to play a particular music track) to a media content server 104 via a network 112. In response to receiving the media control requests, the media content server 104 transmits, and the media presentation system 108 receives, a first data stream for the requested media item via the network 112. The media presentation system 108 plays the requested media item. At the same time, the client device 102-1 also captures audio data from an input device of the client device 102-1 (e.g., user vocals recorded by a microphone). The captured audio data (e.g., user vocals) are then transmitted as a second data stream via the network 112 to the media presentation system 108. While playing the requested media item, the media presentation system 108 overlays the first data stream with the second data stream (e.g., user vocals) received from the client device 102-1, and plays the overlaid audio data along with the requested media item (e.g., a composite data stream combining the user vocals and requested media item).

Additionally and/or alternatively, client devices 102 transmit data (e.g., data stream including audio data for user vocals) to media presentation systems 108 (and media presentation systems 108 receive data from client devices 102) directly through one or more wired (e.g., auxiliary cable, USB, etc.) and/or wireless (e.g., BLUETOOTH/BLE) communication technologies, radio-frequency-based near-field-communication (NFC) technologies, infrared communication technologies, or other close-range wireless communications protocols) communications channels 106 106-1 . . . 106-$p$ (where p is an integer greater than or equal to one). As an example, while playing a requested media item being received from the media content server 104 via network 112, the media presentation system 108 also receives a data stream from a client device 102-1 via communications channel 106-1 (e.g., Bluetooth) that includes user vocals recorded by the client device 102-1 and plays the user vocals.

In some implementations, while playing a media item, the media presentation system 108 receives data streams from multiple client devices 102 (e.g., different user vocals from different client devices), and overlays the received data streams (e.g., the different user vocals) with a media item being played.

In some implementations, the media presentation system 108 plays a media item that is associated with a media control request by a first client device (e.g., client device 102-1), while the media presentation system 108 receives a data stream that includes user vocals from a second client device (e.g., client device 102-$n$). Thus, one client device is used for controlling and requesting a media item to be played on the media presentation system, while a different client device records and transmits the user vocals with which the requested media item is overlaid.

In some implementations, each media presentation system 108 is associated with an identifier (e.g., a unique hardware or application identifier, a network address, etc.) that the media content server 104 uses to identify and/or establish communications with the media presentation system. As described herein, in some implementations, a client device 102 sends, through network(s) 112, a media control request (e.g., a request to play a new song) including an authentication token to media content server 104. After verifying that the authentication token is valid, the media content server 104, in some implementations, retrieves an identifier of a particular media presentation system 108 that is associated with the authentication token. Accordingly, in some implementations, the media content server 104 can first verify that client device 102 is authorized to send media control requests to a media presentation system 108 and can then send a command corresponding to the media control request to the media presentation system 108, even though the client device 102 is not otherwise associated with the media presentation system 108. A user of the client device 102 thus can control media presentation at a shared media presentation system.

Figure 2:
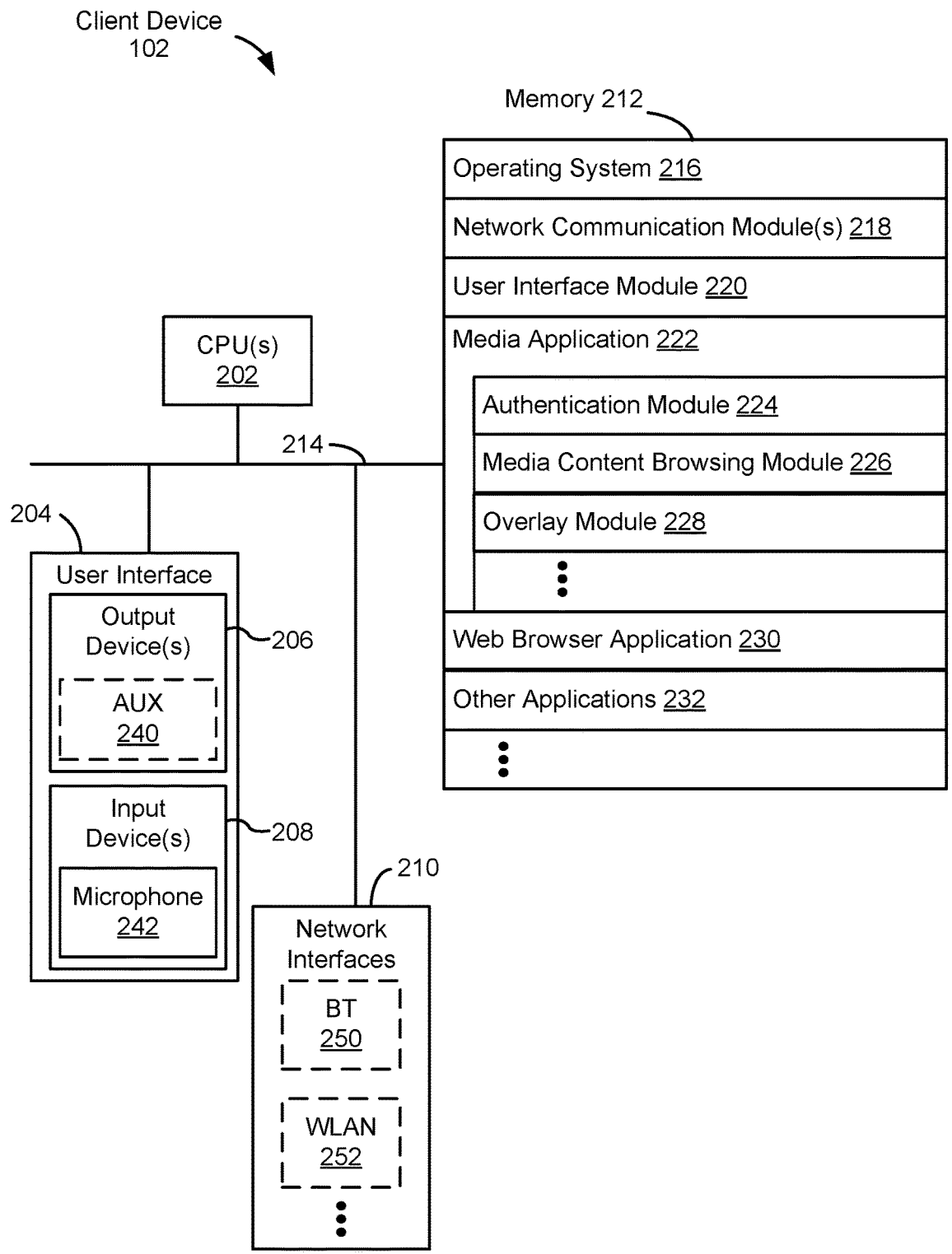
FIG. 2 is a block diagram illustrating an exemplary client device in accordance with some implementations.

FIG. 2 is a block diagram illustrating an exemplary client device 102 (e.g., client device 102-1, . . . client device 102-$n$ of FIG. 1) in accordance with some implementations. The client device 102 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 includes a user interface 204, including output device(s) 206 and input device(s) 208. In some implementations, the input devices 208 include a keyboard or track pad. Alternatively, or in addition, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The client device 102 includes one or more audio input devices (e.g., a microphone) to capture audio (e.g., user vocals). The output devices 206 optionally include speakers or an audio output connection (i.e., audio jack) connected to speakers, earphones, or headphones. For example, the client device 102 optionally includes an auxiliary output 240 through which a data stream (e.g., of audio data) can be output to a media presentation system 108 (e.g., received at an auxiliary input 442, FIG. 4) for playback. Furthermore, some client devices 102 use a microphone (e.g., microphone 242) and voice recognition device to supplement or replace the keyboard. Optionally, the client device 102 includes a location-detection device, such as a GPS (global positioning satellite) or other geo-location receiver, and/or location-detection software for determining the location of the client device 102.

In some implementations, the one or more network interfaces 210 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 210 include a Bluetooth interface 250 for enabling wireless data communications with other client devices 102, media presentations systems 108, and/or or other Bluetooth-compatible devices (e.g., for sending audio data for user vocals to the media presentations system 108). Furthermore, in some implementations, the one or more network interfaces 210 includes a wireless LAN (WLAN) interface 252 for enabling data communications with other WLAN-compatible devices (e.g., a media presentations system 108) and/or the media content server 104 (via the one or more network(s) 112, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

an operating system 216 that includes procedures for handling various basic system services and for performing hardware dependent tasks;

network communication module(s) 218 for connecting the client device 102 to other computing devices (e.g., client devices 102, media presentation systems 108, media content server 104, and/or other devices) via the one or more network interface(s) 210 (wired or wireless);

a user interface module 220 that receives commands and/or inputs from a user via the user interface 204 (e.g., from the input devices 208), and provides outputs for playback and/or display by the user interface 204 (e.g., the output devices 206);

a media application 222 (e.g., an application associated with a media content provider, including a media player, a streaming media application, or any other appropriate application or component of an application) for browsing, receiving, processing, presenting, and requesting playback of media content (e.g., media content streams, media content files, advertisements, web pages, videos, audio, games, etc.). The media application 222 also includes the following modules (or sets of instructions), or a subset or superset thereof:

an authentication module 224 for sending authentication tokens corresponding to one or more media presentation systems associated with the client device 102 (e.g., one or more of the media presentation systems 108 from FIG. 1), receiving authentication tokens from other client devices, and optionally generating authentication tokens for media presentation systems associated with client device 102;

a media content browsing module 226 for providing controls and/or user interfaces enabling a user to navigate, select for playback (e.g., by sending a media control request to a media content server 104, which then sends a data stream for requested media content to a media presentation system 108, FIG. 1), and otherwise control or interact with media content, whether the media content is stored or played locally or remotely;

an overlay module 228 for sending audio data (e.g., user vocals recorded using microphone 242) to other devices or systems for overlaying with media content (e.g., overlaying user vocals with a requested music track);

a web browser application 230 (e.g., Internet Explorer by Microsoft, Firefox by Mozilla, Safari by Apple, or Chrome by Google) for accessing, viewing, and interacting with web sites; and other applications 232, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
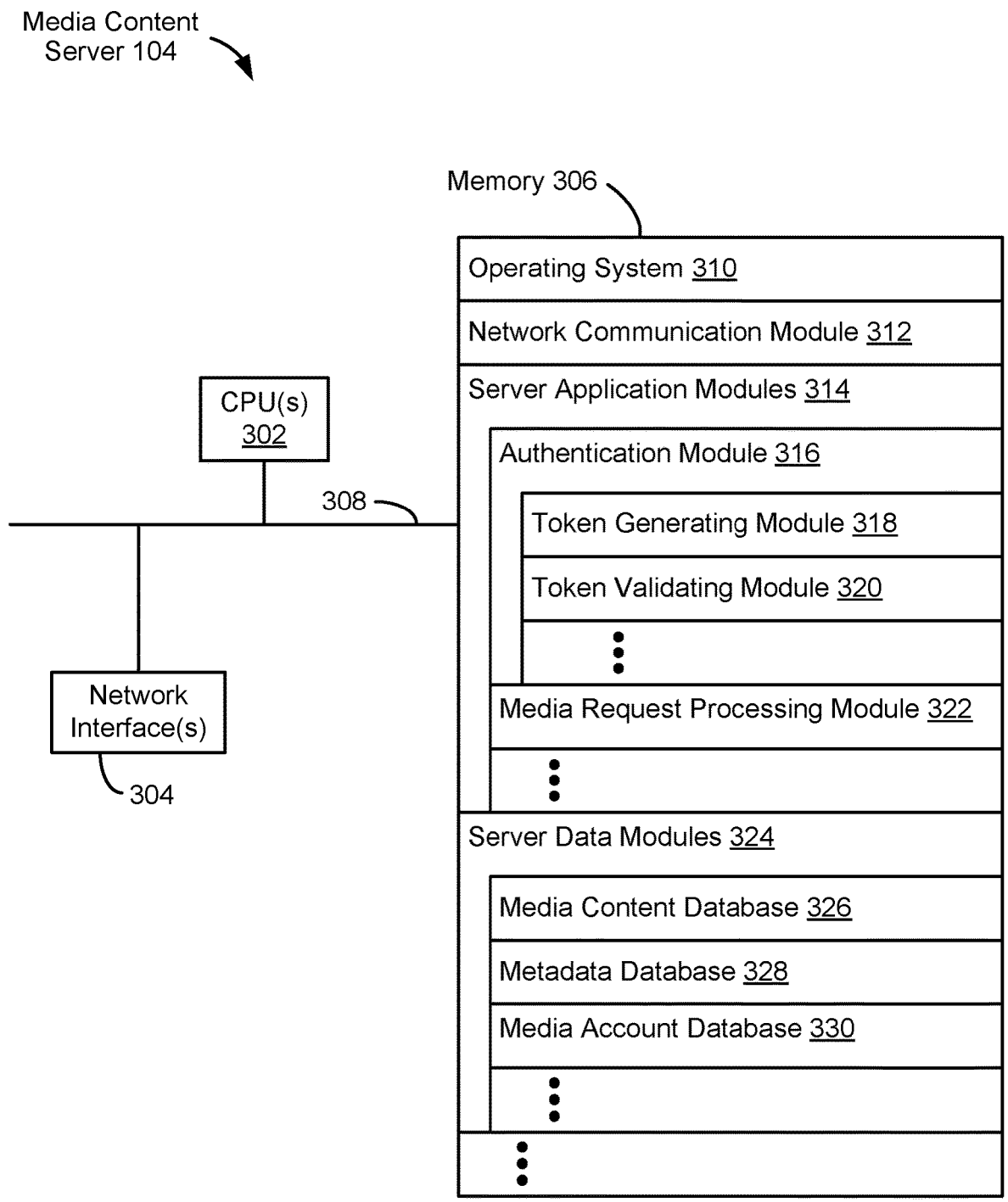
FIG. 3 is a block diagram illustrating an exemplary media content server in accordance with some implementations.

FIG. 3 is a block diagram illustrating an exemplary media content server 104 in accordance with some implementations. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

an operating system 310 that includes procedures for handling various basic system services and for performing hardware dependent tasks;

a network communication module 312 that is used for connecting the media content server 104 to other computing devices via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;

one or more server application modules 314 for enabling the media content server 104 to perform various functions, the server application modules 314 including, but not limited to, one or more of:

an authentication module 316 for managing authentication and/or authorization requests, the authentication module 316 including, but not limited to, one or more of:

a token generating module 318 for generating authentication tokens permitting use of media presentation systems 108 (FIG. 1); and a token validating module 320 for verifying that an authentication token is valid (e.g., has not yet expired or has not yet been revoked);

a media request processing module 322 for processing requests for media content (e.g., received from client devices 102) and facilitating access to requested media content items by client devices 102 including, optionally, streaming media content to such devices or to one or more media presentation systems 108; and one or more server data module(s) 324 for handling the storage of and access to media content items and metadata relating to the media content items; in some implementations, the one or more server data module(s) 324 include:

a media content database 326 for storing media content items (e.g., audio files, video files, text files, lyrics for media content, etc.);

a metadata database 328 for storing metadata relating to the media content items (e.g., pitch, beat, and/or chord data for media items for auto-tuning user vocals); and a media account database 330 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the media content server 104 in accordance with some implementations, FIG. 3 is intended more as a functional description of the various features that may be present in one or more media content servers than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

In some implementations, the media content server 104 uses tables, databases, or other appropriate data structures to associate respective users with respective media presentation systems and to manage authentication tokens (i.e., access tokens) associated with respective media presentation systems.

Figure 4:
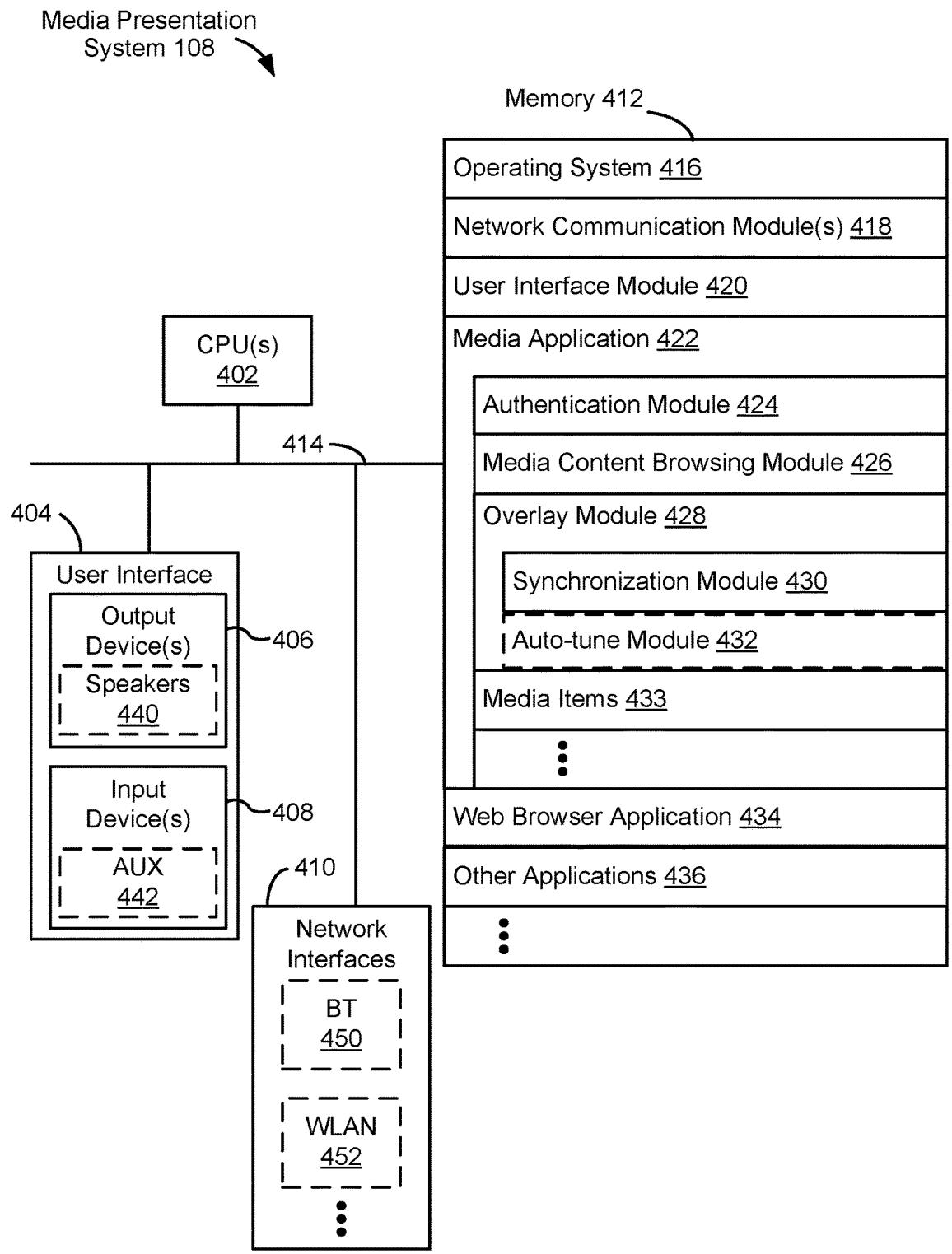
FIG. 4 is a block diagram illustrating an exemplary media presentation system in accordance with some implementations.

FIG. 4 is a block diagram illustrating an exemplary media presentation system 108 in accordance with some implementations. The media presentation system 108 typically includes one or more central processing units (CPU(s), e.g., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

As also shown in FIG. 4, the media presentation system 108 includes a user interface 404, including output device(s) 406 and input device(s) 408. In some implementations, the input devices include buttons, a keyboard, and/or track pad. Alternatively, or in addition, the user interface 404 includes a display device that includes a touch-sensitive surface, in which case the display device is a touch-sensitive display. The media presentation system 108 optionally includes an auxiliary input 442 through which a data stream (e.g., of audio data including user vocals) can be received from a connected device or system (e.g., an auxiliary output 240 of a client device 102, FIG. 2) for playback. The output devices (e.g., output device(s) 406) include speakers 440 and/or an audio output connection (i.e., audio jack) connected to speakers, earphones, or headphones. Optionally, the media presentation system 108 includes a location-detection device, such as a GPS (global positioning satellite) or other geo-location receiver, and/or location-detection software for determining the location of the media presentation system 108.

In some implementations, the one or more network interfaces 410 include wireless and/or wired interfaces for receiving data from and/or transmitting data to other media presentation systems 108, client devices 102, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 410 include a Bluetooth interface 450 for enabling wireless data communications with other client devices 102, media presentations systems 108, and/or or other Bluetooth-compatible devices (e.g., for receiving audio data for user vocals from a client device 102). Furthermore, in some implementations, the one or more network interfaces 410 includes a wireless LAN (WLAN) interface 452 for enabling data communications with other WLAN-compatible devices (e.g., client devices 102, other media presentation systems 108, etc.) and/or the media content server 104 (via the one or more network(s) 112, FIG. 1).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some implementations, memory 412 or the non-transitory computer-readable storage medium of memory 412 stores the following programs, modules, and data structures, or a subset or superset thereof:

- an operating system 416 that includes procedures for handling various basic system services and for performing hardware dependent tasks;
- network communication module(s) 418 for connecting the media presentation system 108 to other computing devices (e.g., client devices 102, media presentation systems 108, a media content server 104, and/or other devices) via the one or more network interface(s) 410 (wired or wireless);
- a user interface module 420 that receives commands and/or inputs from a user via the user interface 404 (e.g., from the input devices 408), and provides outputs for playback and/or display on the user interface 404 (e.g., the output devices 406);
- a media application 422 (e.g., an application associated with a media content provider, including a media player, a streaming media application, or any other appropriate application or component of an application) for browsing, receiving (e.g., from media content server 104), processing, presenting, and playing media content (e.g., media content streams, media content files, advertisements, web pages, videos, audio, games, etc.) and other audio data (e.g., data including user vocals received from a client device 102). The media application 422 also includes the following modules (or sets of instructions), or a subset or superset thereof:
  - an authentication module 424 for sending authentication tokens corresponding to one or more client devices 102 associated with the media presentation system 108, receiving authentication tokens from client devices, and/or generating authentication tokens;
  - a media content browsing module 426 for providing controls and/or user interfaces enabling a user to navigate, select for playback, and otherwise control or interact with media content, whether the media content is stored or played locally or remotely;

an overlay module 428 for receiving audio data (e.g., user vocals recorded using microphone 242 of client device 102, FIG. 2) from other devices or systems and overlaying the received audio data with media content (e.g., overlaying user vocals with a requested music track received from the media content server 104), including, but not limited to, one or more of:

a synchronization module 430 for combining multiple data streams (e.g., by measuring a latency of a communications channel over which audio data for user vocals is received, and offsetting data streams for a media item and user vocals based on the measured latency); and an optional auto-tune module 432 for auto-tuning vocals based on a pitch (e.g., of a media item with which vocals are overlaid);

a web browser application 434 (e.g., Internet Explorer by Microsoft, Firefox by Mozilla, Safari by Apple, or Chrome by Google) for accessing, viewing, and interacting with web sites; and other applications 436, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media application 422 stores media items 433 (e.g., that have been downloaded from the media content server 104).

In some implementations, the media presentation system 108 is a type of client device 102, and includes some or all of the same components, modules, and sub-modules as described above in FIG. 2 with respect to the client device 102.

Each of the above identified modules stored in memory 212, 306, and 412 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212, 306, and 412 optionally store a subset or superset of the respective modules and data structures identified above. Furthermore, memory 212, 306, and 412 optionally store additional modules and data structures not described above.

Figure 5A:
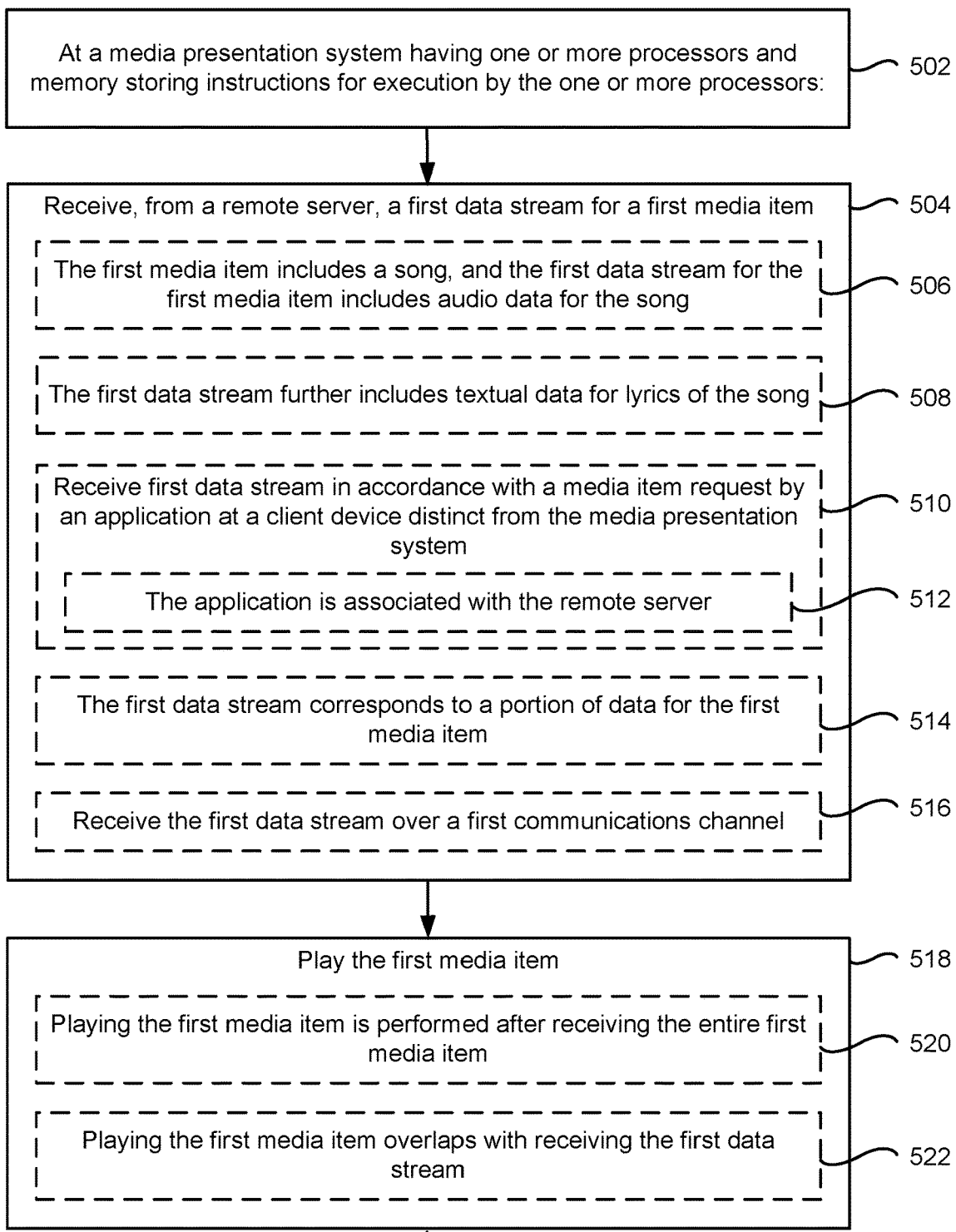
FIGS. 5A-5C are flow diagrams illustrating a method of overlaying and playing back audio data for user vocals and media content in accordance with some implementations.
Figure 5B:
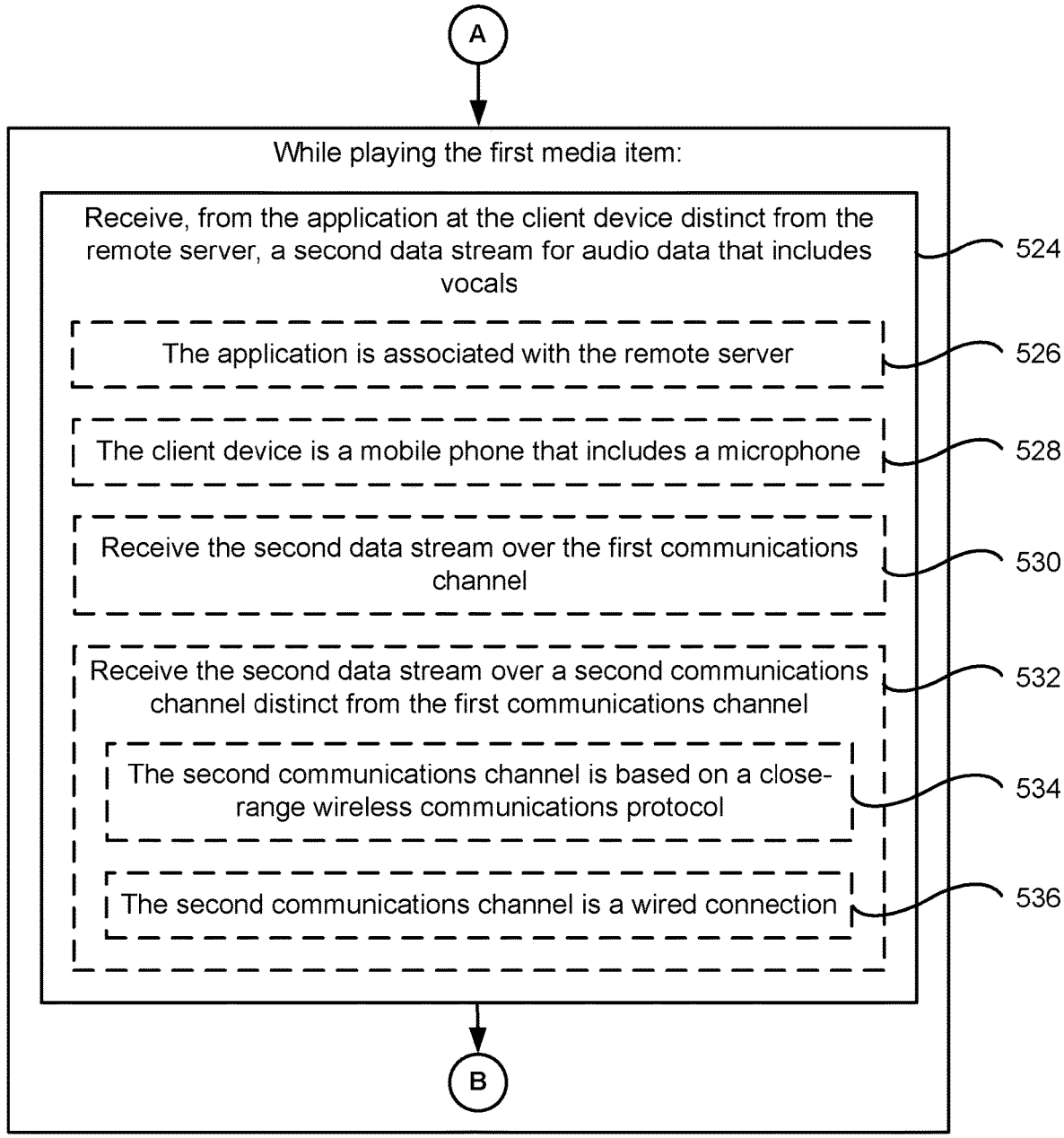
Figure 5C:
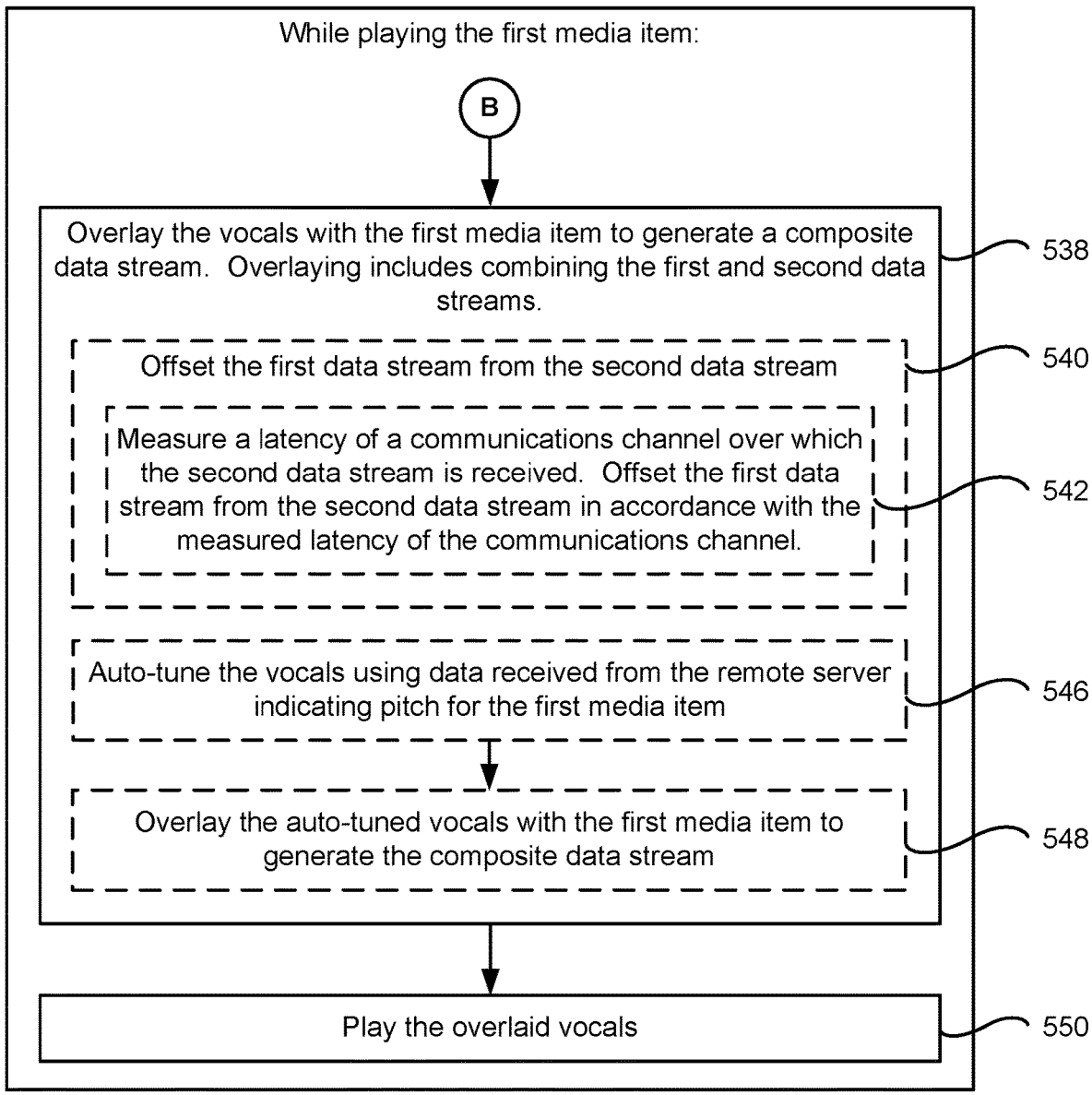

FIGS. 5A-5C are flow diagrams illustrating a method 500 of overlaying and playing back audio data for user vocals and media content, in accordance with some implementations.

The method 500 is performed (502) at a media presentation system (e.g., media presentation system 108, FIGS. 1 and 4) having one or more processors and memory storing instructions for execution by the one or more processors. FIGS. 5A-5C correspond to instructions stored in a computer memory or other computer-readable storage medium (e.g., memory 412 of the media presentation system 108, FIG. 4).

The media presentation system receives (504), from a remote server (e.g., media content server 104, FIGS. 1 and 3), a first data stream for a first media item. In some implementations, the first media item includes (506) a song, and the first data stream for the first media item includes audio data for the song (e.g., audio data for a requested music track). Referring to FIG. 1, for example, the media presentation system 108 receives a data stream for a music track from the media content server 104 via the network(s) 112 (e.g., a LAN connected to a service provider). In some implementations, the first data stream further includes (508) textual data for lyrics of the song.

In some implementations, the media presentation system receives (510) the first data stream in accordance with a media item request by an application at a client device distinct from the media presentation system. For example, using a media application 222 stored on the client device 102-1 (FIG. 2), a user sends a media control request for a particular media item via the network(s) 112 to the media content server 104. The media content server 104 processes the media control request and transmits the first data stream for the requested media item to the media presentation system 108 (and the media presentation system 108 receives the first data stream from the media content server 104) via the network(s) 112. In some implementations, the application (e.g., media application 222) is associated (512) with the remote server (e.g., media content server 104). For example, the application may be a downloadable application that users of a service provided by the remote server use to request and play media.

In some implementations, the first data stream corresponds (514) to a portion of data for the first media item. The first media item may, for example, be streamed to the media presentation system 108 such that the first media item is transmitted to the media presentation system portions at a time. The media presentation system buffers and/or plays transmitted portions of the first media item as they are received.

In some implementations, the media presentation system receives (516) the first data stream over a first communications channel (e.g., a wireless LAN, such as a Wi-Fi network).

The media presentation system plays (518) the first media item. In some implementations, playing (518) the first media item is performed (520) after receiving the entire first media item. For example, the media presentation system 108 plays a requested music track after completely downloading the entire file for the music track. Alternatively, playing (518) the first media item overlaps with receiving (522) the first data stream. In other words, the first media item is played while it is being received from the remote server by the media presentation system (and while the remote server is transmitting the first media item to the media presentation system), before the first media item is received in its entirety (e.g., the first media item is streamed to the media presentation system).

Referring now to FIG. 5B, while playing (518) the first media item, the media presentation system receives (524), from the application at the client device distinct from the remote server, a second data stream for audio data that includes vocals. As an example, as the media presentation system plays the first media item, a user may sing along with the first media item by using a microphone 242 of a client device 102-1 (recorded using media application 222, FIG. 2). Audio data recorded by the microphone 242 (e.g., vocals) is then transmitted (by the media application 222) to the media presentation system 108.

In some implementations, the application is associated (526) with the remote server (e.g., media application 222 is a downloadable application that users of a service provided by the media content server 104 use to overlay vocals over requested media).

In some implementations, the client device is (528) a mobile phone that includes a microphone (e.g., client device 102-1 with a microphone 242, FIG. 2).

In some implementations, the media presentation system receives (530) the second data stream over the first communications channel. That is, in some cases, the media presentation system receives the first data stream for the first media item (e.g., data stream for a music track) and the second data stream for audio data that includes vocals (e.g., recorded user vocals) over the same communications channel (e.g., over the same wireless LAN).

In some implementations, the media presentation system receives (532) the second data stream over a second communications channel (e.g., communications channel 106-1, FIG. 1) distinct from the first communications channel (e.g., a wireless LAN of the network(s) 112). The second communications channel, in some implementations, is based (534) on a close-range wireless communications protocol (e.g., audio data including user vocals is transmitted via a Bluetooth connection, where the audio data is sent by the client device 102-1 through the Bluetooth interface 250 and received by the media presentation system 108 through the Bluetooth interface 450, FIGS. 2 and 4). Alternatively, in some implementations, the second communications channel is (536) a wired connection (e.g., audio data including user vocals is sent by the client device 102-1 through the auxiliary output 240 and received by the media presentation system 108 through the auxiliary input 442, FIGS. 2 and 4).

Continuing with FIG. 5C, while playing (518) the first media item, the media presentation system overlays (538) the vocals with (i.e., onto) the first media item to generate a composite data stream. Overlaying includes combining the first and second data streams. The media presentation system plays (550) the overlaid vocals, which are thus played along with the first media item. Thus, the audio recording functionality of a client device may be used to sing along with a requested media item, where the media presentation system is configured to output audio that combines user vocals with the requested media item.

In some implementations, playing the overlaid vocals while playing the first media item comprises playing the composite data stream (e.g., an overlay module 428 combines data from the first data stream for a music track with data from the second data stream that includes user vocals to form a composite data stream, which is then output through speakers of the media presentation system 108, FIG. 4).

In some implementations, receiving (524) the second data stream, overlaying (538) the vocals, and playing (550) the overlaid vocals overlap with receiving (504) the first data stream. That is, the media presentation system overlays user vocals with the first data stream in real-time as audio data for the requested media item and audio data for the user vocals are streamed to and received by the media presentation system.

In some implementations, overlaying (538) the vocals includes offsetting (540) the first data stream from the second data stream (e.g., implementing a time delay between the first data stream and the second data stream). In some implementations, offsetting (540) includes measuring (542) a latency of a communications channel over which the second data stream is received. The media presentation system offsets the first data stream from the second data stream in accordance with (e.g., proportional to) the measured latency of the communications channel. In some implementations, the communications channel is based on a wireless communications protocol (e.g., Bluetooth).

In some implementations, the offsetting (540) is performed if the first data stream and the second data stream are received over distinct communications channels (e.g., receiving data stream for media item over wireless LAN and receiving data stream for user vocals over Bluetooth). In some implementations, the offsetting (540) is performed if the second data stream is received over a wireless communications channel (e.g., Bluetooth). In some implementations, the media presentation system foregoes offsetting the first data stream from the second data stream if the second data stream is received over a wired connection (e.g., an auxiliary cable).

In some implementations, the media presentation system auto-tunes (546) the vocals using data received from the remote server indicating pitch, beat, and/or chords for the first media item (e.g., pitch data stored in metadata database 328, FIG. 3). The media presentation system overlays (548) the auto-tuned vocals with the first media item to generate the composite data stream. In some implementations, the media presentation system modulates the vocals to produce a selected sound effect (e.g., a robot voice or vocoder effect) and overlays (548) the modulated vocals with the first media item to generate the composite data stream.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
   at a media presentation system having a network connection, one or more processors, and memory storing instructions for execution by the one or more processors, wherein the media presentation system is distinct from a remote server and distinct from a client device:
   receiving, over a first communications channel, from the remote server via the network connection, a first data stream for a first media item;
   playing the first media item; and
   while playing the first media item:
      receiving, over a second communications channel distinct from the first communications channel, from an application at the client device distinct from the remote server and distinct from the media presentation system, a second data stream for audio data that includes vocals provided by a user as the first media item plays;
      measuring a latency of the second communications channel;

overlaying, with the first media item, the vocals provided by the user as the first media item plays to generate a composite data stream, the overlaying comprising:
    offsetting the first data stream from the second data stream in accordance with the measured latency of the second communications channel; and
    combining the first and second data streams in accordance with the offset of the data streams; and
playing the composite data stream, including the overlaid vocals provided by the user and the first media item.

2. The method of claim 1, wherein the first media item includes a song, and the first data stream for the first media item includes audio data for the song.

3. The method of claim 2, wherein the first data stream further comprises textual data for lyrics of the song.

4. The method of claim 1, wherein the application is associated with the remote server.

5. The method of claim 1, wherein the first data stream is received in accordance with a media item request by the application at the client device.

6. The method of claim 1, wherein the client device is a mobile phone that includes a microphone.

7. The method of claim 1, wherein receiving the second data stream; overlaying, with the first media item, the vocals; and playing the overlaid vocals overlap with receiving the first data stream.

8. The method of claim 7, wherein the first data stream corresponds to a portion of data for the first media item.

9. The method of claim 1, wherein playing the first media item is performed after receiving the entire first media item.

10. The method of claim 1, wherein the second communications channel is based on a close-range wireless communications protocol.

11. The method of claim 1, wherein the second communications channel is a wired connection.

12. The method of claim 1, wherein overlaying, with the first media item, the vocals comprises:
    auto-tuning the vocals using data received from the remote server indicating pitch for the first media item; and
    overlaying, with the first media item, the auto-tuned vocals to generate the composite data stream.

13. The method of claim 1, wherein the client device is a first client device and the composite data stream further includes vocals provided by a second user at a second client device distinct from the first client device.

14. The method of claim 1, wherein the latency of the second communications channel is a latency measured between the client device and the media presentation system.

15. A media presentation system distinct from a remote server and distinct from a client device, comprising:
one or more processors; and
memory storing one or more programs for execution by the one or more processors, the one or more programs including instructions for:
    receiving, over a first communications channel, from the remote server via the network connection, a first data stream for a first media item;
    playing the first media item; and
    while playing the first media item:
        receiving, over a second communications channel distinct from the first communications channel, from an application at the client device distinct from the remote server and distinct from the media presentation system, a second data stream for audio data that includes vocals provided by a user as the first media item plays;
        measuring a latency of the second communications channel;
        overlaying, with the first media item, the vocals provided by the user as the first media item plays to generate a composite data stream, the overlaying comprising:
            offsetting the first data stream from the second data stream in accordance with the measured latency of the second communications channel; and
            combining the first and second data streams in accordance with the offset of the data streams; and
        playing the composite data stream, including the overlaid vocals provided by the user and the first media item.

16. A non-transitory computer-readable storage medium storing one or more programs for execution by one or more processors of a media presentation system having a network connection, wherein the media presentation system is distinct from a remote server and distinct from a client device, the one or more programs including instructions for:
receiving, over a first communications channel, from the remote server via the network connection, a first data stream for a first media item;
playing the first media item; and
while playing the first media item:
    receiving, over a second communications channel distinct from the first communications channel, from an application at the client device distinct from the remote server and distinct from the media presentation system, a second data stream for audio data that includes vocals provided by a user as the first media item plays;
    measuring a latency of the second communications channel;
    overlaying, with the first media item, the vocals provided by the user as the first media item plays to generate a composite data stream, the overlaying comprising:
        offsetting the first data stream from the second data stream in accordance with the measured latency of the second communications channel; and
        combining the first and second data streams in accordance with the offset of the data streams; and
    playing the composite data stream, including the overlaid vocals provided by the user and the first media item.

\* \* \* \* \*